United States Patent [19]
Aspinall et al.

[11] 3,810,000
[45] May 7, 1974

[54] EARTH POLARIZATION METER WITH VOLTAGE CONTROL DURING CURRENT INJECTION

[75] Inventors: Arnold Aspinall, Bradford; David Gordon Spruce, Huddersfield, both of England; John Thomas Lynam, Kambalda, Australia

[73] Assignee: National Research Development Corporation, London, England

[22] Filed: Feb. 16, 1972

[21] Appl. No.: 226,885

[30] Foreign Application Priority Data
Mar. 9, 1971 Great Britain................... 6346/71

[52] U.S. Cl............................................ 324/1, 324/9
[51] Int. Cl............................................. G01v 3/04
[58] Field of Search................. 324/1, 9, 10, 64, 30

[56] References Cited
UNITED STATES PATENTS

| | | |
|---|---|---|
| 2,880,389 | 3/1959 | Ferre et al. ............................. 324/1 |
| 3,054,046 | 9/1962 | Holmes et al. ...................... 324/10 X |
| 2,611,004 | 9/1952 | Brant et al. ............................. 324/1 |
| 2,931,972 | 4/1960 | Tilley ................................... 324/9 X |
| 3,235,793 | 2/1966 | Reese ....................................... 324/1 |
| 3,283,240 | 11/1966 | Spady ................................. 324/64 X |
| 3,566,233 | 2/1971 | Kahn et al. ......................... 324/64 X |

*Primary Examiner*—Gerard R. Strecker
*Attorney, Agent, or Firm*—Cushman, Darby & Cushman

[57] ABSTRACT

This invention concerns a meter for measuring polarisation induced in the earth and in particular for measuring transient voltages that follow the termination of direct current flow through the ground. In this device automatic normalisation of the data is achieved by correllating the voltage source producing the transient voltages with the potential measured across measurement electrodes in such a manner that the voltage source and measurement circuits are not otherwise electrically linked.

5 Claims, 3 Drawing Figures

EARTH POLARIZATION METER WITH VOLTAGE CONTROL DURING CURRENT INJECTION

The present invention concerns earth polarisation meters which are particularly used in the field of geophysical exploration. The measurements of polarisation induced in the earth has in fact become an important technique for the detection of mineral distributions.

The principal characteristic of induced polarisation is a transient voltage that follows the termination of a direct current flow through the ground. The time constant of this decay generally is approximately one half of one second but may be as high as 10 seconds under favourable geological conditions. Normally, there is considered to be two types of induced polarisation. The first, which is predominantly overvoltage, is that observed over sulphides and other minerals. The second type, with the normal effect, is much smaller in magnitude and is measured in areas where mineralisation is not present to any great degree. The normal effect is present in most earth materials and rocks and is almost certainly due to the presence of slight concentrations of minerals and disseminated clay phases within rock structures.

It is also known that the absolute resistivity of the earth can influence induced polarisation measurements taken at the surface. It is possible to demonstrate theoretically that a resistive sphere, which has the same polarisability as the background medium, but different electrical resistivity, will show an apparent polarisability of a magnitude that depends upon geometry factors and the resistivity contrast between the sphere and the medium. This inter-relationship between absolute resistivity and induced polarisation is a consequence of the field nature of the latter. If, in a homogenous polarisable medium, the energising ohmic potential difference between the measuring electrodes is altered, then the measured induced polarisation will change in the manner indicated above.

It is also known to normalise the observed data by dividing the data by the resistance as measured at that station. This procedure has heretofore been carried out manually.

According to the present invention, there is provided an earth polarisation meter comprising a source of electric power suitable for connection to a pair of earth electrodes, a measuring circuit suitable for connection to a further pair of electrodes for measuring the earth polarisation voltage produced when current from the voltage source is injected into the earth, and control means for controlling the voltage produced by said source in response to the potential difference measured by said measuring circuit in such a manner that the power source and the measuring circuit are electrically isolated and that the measured potential difference remains constant.

An embodiment of the present invention will now be described by way of example and with reference to the accompanying drawings in which.

Figure 1:
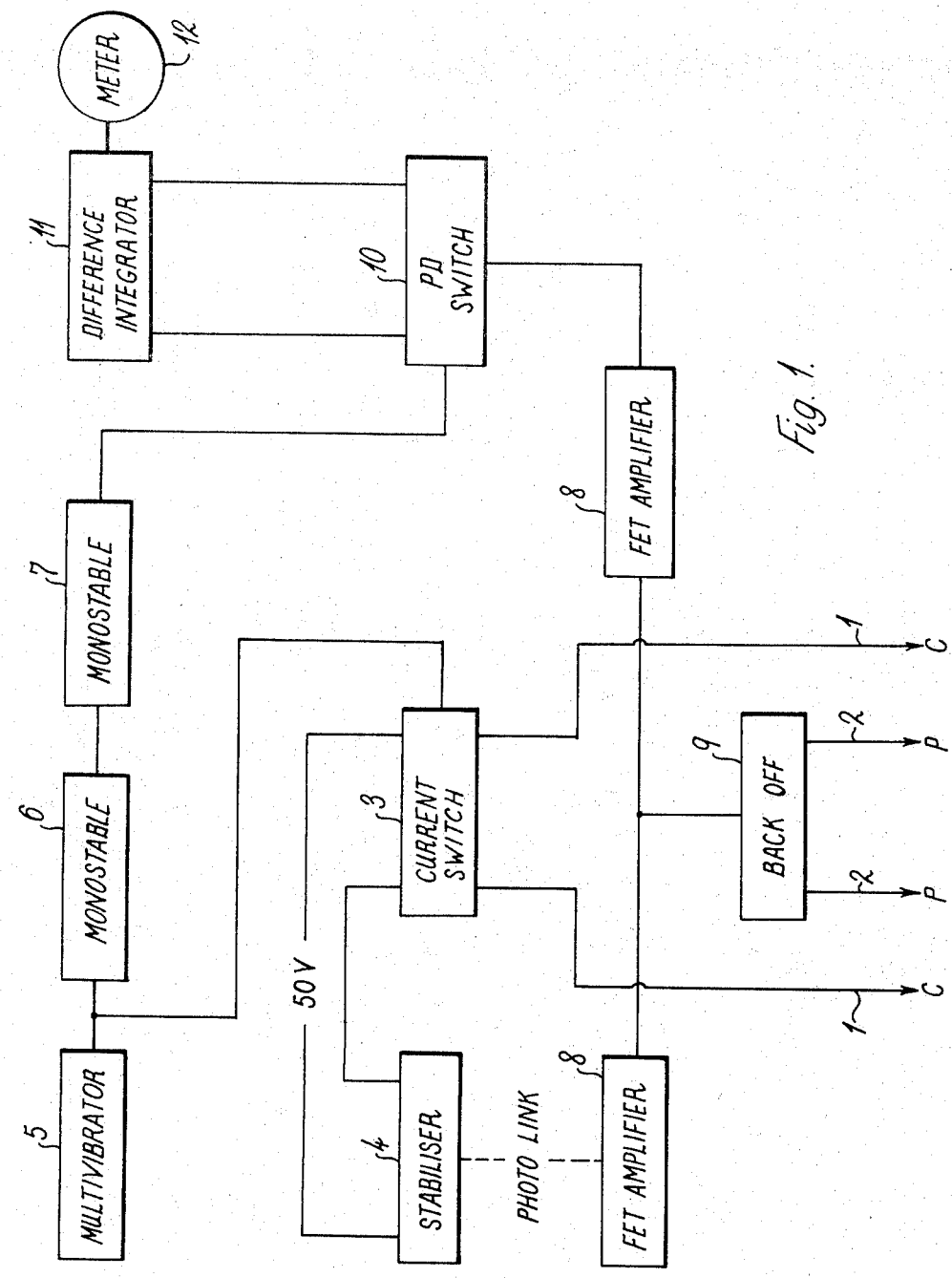
FIG. 1 is a block diagram of an earth polarisation meter constructed in accordance with the present invention.
Figure 2:
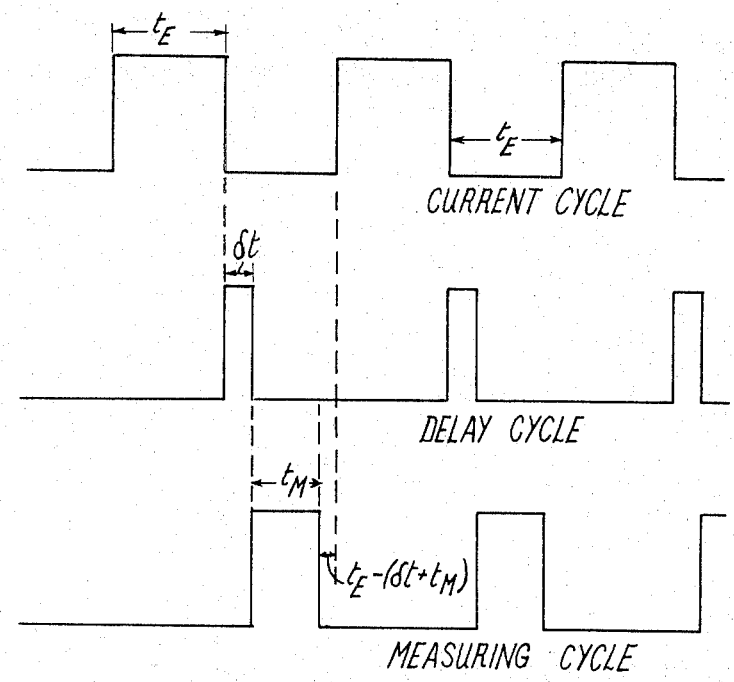
FIG. 2 is a series of waveforms illustrating the operation of the meter shown in FIG. 1.

The earth polarisation meter shown in FIG. 1 of the accompanying drawings operates by feeding a direct current between two steel earth electrodes 1,1 for a short period of time. After this period the direct current is switched off and the subsequent polarisation phenomenon picked up by two non-polarisable earth electrodes 2,2 placed in the earth between the electrodes 1,1. The energising circuit provides the voltage across the electrodes 1,1 and comprises a current switch 3 connected to the earth electrodes 1,1 and coupled to a stabiliser 4 which provides a controlled current flow at roughly 50 volts as shown. The current switch 3 is controlled by a multivibrator 5 producing a square wave with a 50/50 mark space ratio, this wave being shown at A in FIG. 2. The current switch 3 is initially closed by the leading edge of each square wave from the multivibrator 5 so that a dc current flows through the earth between the electrodes 1,1 for a time $t_E$. At the trailing edge of the square wave, the current switch 3 is opened and a first monostable 6 is triggered, the monostable 6 giving a delay of $\Delta t$. This delay allows transients of electromagnetic origin to dissipate before measurement of the earth polarisation voltage induced by the flow of current between the electrodes 1,1. When the monostable flip-flop 6 resets it triggers a second monostable flip-flop 7 which closes a measuring circuit for a time $t_M$. At the end of time $t_M$ the monostable flip-flop 7 resets and after a further delay of $t_E - (\Delta t + t_M)$ the energising circuit is closed by the leading edge of the next square wave, thus enabling the cycle to be repeated indefinitely.

The measuring circuit comprises a pair of connected FET amplifiers 8 and a back off device 9 connected to the junction between the amplifiers 8 and itself connected across the earth electrodes 2,2. During the period $t_E$ the measuring circuit does not record the potential difference set up between the electrodes 2,2. However, when the monostable flip-flop 7 is triggered the amplified signal from the electrodes 2,2 passes via a pd switch 10 to a symmetrical difference integrator 11. The integrator 11 has two independent inputs and gives an output to a suitably calibrated meter 12, the output being the difference between the integrals of the signals in each of its arms. This arrangement is necessary because of the presence of dc self potentials in the earth. These self potentials, which are electromagnetic in nature, add themselves directly to any induced polarisation voltages, thereby giving results which are not consistent with the polarisation properties of the medium under consideration. Thus, in order to remove this unwanted effect, it is necessary to take two readings at each station. Firstly, before the energising current is injected into the earth via the electrodes 1,1 the earth self potential is measured, integrated and stored in one arm of the integrator 11. Then a pulse of energising current is passed between the electrodes 1,1 as previously described and the subsequent induced polarisation effects are measured and the integral of the induced polarisation voltage plus the self potential stored in the other arm of the integrator 11. The output of the difference integrator 11 is then the true induced polarisation integral and this is displayed on the meter 12. In order to effect normalisation of the readings the potential difference between the measuring electrodes 2,2 is kept constant. In order to achieve this, the energizing circuit and the measuring circuit have to be kept electrically isolated. This is because of the nature of the electrodes 1,1. These, being steel, exhibit polarisation effects which must not be transferred to the measuring system.

Accordingly the stabiliser 4 includes a photoresistor in series with the supply voltage whilst the left hand FET amplifier 6 includes a light source. The photolink thus formed is indicated at 13. The intensity of the light source is controlled by the potential difference between the measuring electrodes 2,2 which controls the value of the photoresistor which in turn controls the voltage applied to the electrodes 1,1 to ensure that the potential difference between the measuring electrodes 2,2 is maintained at a constant magnitude. This has the result that the current flowing through the ground between the electrodes 1,1 during the energising period is directly proportional to the electrical conductivity of the earth. A direct current measuring instrument in series with the voltage supply can be used to indicate the variations in the apparent conductivity.

When measuring induced polarisation voltages it is necessary that the measuring electrodes be of the non-polarisable type. Such electrodes have been used extensively in geophysical work because of the polarisation potential differences which would otherwise be induced on the measuring electrodes. This electrode polarisation is of exactly the same nature as induced polarisation and has long been recognised as a serious disadvantage in exploration by direct current methods. Traditionally, non-polarisable electrodes have been rather unwieldy, each consisting of a porous pot approximately 6 inches long and 4 or 5 inches in diameter, filled with a saturated copper sulphate solution and containing a copper electrode. These pots are carried from station to station and generally require watering in order that good contact may be made with the earth directly beneath them. This type of electrode is quite suitable for geophysical survey work, where the greatest time consumed is in the transfer from station to station; they are completely unsuitable for small-scale surveys appropriate to archaology and slow down the operational speed considerably.

Figure 3:
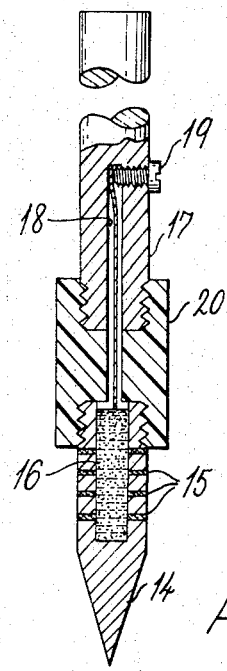
FIG. 3 is an exploded cross-section through a non-polarisable electrode suitable for use with the meter of FIG. 1.

Accordingly FIG. 3 of the accompanying drawings shows a non-polarisable electrode suitable for use as a measuring electrode in the earth polarisation meter shown in FIG. 1. This electrode is robust enough to be pushed into the ground and makes good contact with the surrounding earth. The electrode comprises a basic forma 14 made of Tufnal (Registered Trade Mark) perforated with a number of 1mm holes indicated at 15. The perforations are filled with fire cement which is itself non-polarisable and hardens into a porous matrix. This is the medium by which contact is made across the wall of the electrode. The interior of the electrode is filled with a copper sulphate gell which also permeates the fire cement plugs. Saturated copper sulphate solution is made up at boiling point and is mixed with Agar solution. When cooled to room temperature, the mixture solidifies into a saturated copper gell to make a highly stable and robust electrolyte. A steel stake 17 having an interior bore 18 in which a clean strip of copper can be fixed by a nipping screw 19 can be secured to the forma 14 by a sleeve 20, also of Tufnol. At this stage care must be taken that there is no direct contact between the steel stake and the copper sulphate solution, otherwise polarisation potentials are likely to set up again. When it is desired to use the electrode in the field contact is made to the steel stake to which the electrode is attached.

It is possible particularly for laboratory work, to do away completely with the porous fire cement and to employ a metal copper electrode surrounded by the copper sulphate gell.

We claim:

1. An earth polarization meter comprising:
   first and second pairs of earth electrodes,
   a source of electric power for connection to said first pair of earth electrodes,
   measuring circuit means for connection to said second pair of electrodes for measuring the potential difference between the earth self potential before injection of current into the earth by said source and the earth polarization voltage between said electrodes of said second pair produced following injection of current from said source into the earth and after said source ceases injecting current into the earth, and
   control means coupled to said second pair of electrodes and operative during injection of current into the earth for controlling the voltage produced by said source to maintain the potential difference between said electrodes of second pair of electrodes constant while said source is injecting current into the earth.

2. An earth polarization meter as claimed in claim 1 further including means for detecting the potential between said second pair of electrodes and wherein said control means comprise a light source the intensity of which is controlled by the potential between said electrodes of said second pair as detected by said detecting means and a photo sensitive means mounted for receiving illumination from said light source for varying the voltage supplied by the source of electric power as a function of incident light.

3. An earth polarisation meter as claimed in claim 2 wherein the source of electric power comprises a current switch for connection to said first pair of earth electrodes and controlled by a multi-vibrator, the current switch being coupled to a voltage stabliser which includes said photo sensitive means.

4. An earth polarization meter as claimed in claim 3 wherein the detecting means and measuring circuit means each comprise a connected FET amplifier, and further including a back off device connected to the junction between the FET amplifiers and arranged for connection to said second pair of earth electrodes.

5. An earth polarisation meter as claimed in claim 4 wherein the output of the multi-vibrator is connected via at least one delay circuit to a switch connecting the output of the FET amplifiers to a difference integrator.

* * * * *